(12) United States Patent
Cheng

(10) Patent No.: US 9,434,433 B1
(45) Date of Patent: Sep. 6, 2016

(54) SAFETY MOTORCYCLE STAND

(71) Applicant: Wan-Jye Cheng, Hsinchu (TW)

(72) Inventor: Wan-Jye Cheng, Hsinchu (TW)

( * ) Notice: Subject to any disclaimer, the term of this patent is extended or adjusted under 35 U.S.C. 154(b) by 0 days.

(21) Appl. No.: 14/875,845

(22) Filed: Oct. 6, 2015

(30) Foreign Application Priority Data

Apr. 8, 2015 (TW) .............................. 104205213 U

(51) Int. Cl.
*B62H 1/02* (2006.01)
(52) U.S. Cl.
CPC ....................................... *B62H 1/02* (2013.01)
(58) Field of Classification Search
CPC .................................. B62H 1/00; B62H 1/02
See application file for complete search history.

(56) References Cited

U.S. PATENT DOCUMENTS

| | | | | |
|---|---|---|---|---|
| 3,908,780 A | * | 9/1975 | McClure | B62H 1/02 180/271 |
| 4,084,656 A | * | 4/1978 | Itoh | B60K 28/00 180/219 |
| 4,095,823 A | * | 6/1978 | Nishida | B62H 1/02 280/301 |
| 7,140,631 B2 | * | 11/2006 | Ridley | B62H 1/02 280/301 |

* cited by examiner

*Primary Examiner* — Kevin Hurley
(74) *Attorney, Agent, or Firm* — Rosenberg, Klein & Lee

(57) ABSTRACT

A safety motorcycle stand is installed on the bottom of a motorcycle body and comprises an elastic support stand and an electromagnetic switch device. An anti-return protrusion of the electromagnetic switch device protrudes from the switch body and presses against the elastic support stand contacting the ground, whereby the elastic support stand coupled to the motorcycle body stands up the motorcycle body on the ground. The electromagnetic switch device has a signal cable connected with the start switch of the motorcycle body. While the motorcycle body is started, a current flows to the electromagnetic switch device to make the anti-return protrusion withdraw into the switch body, whereby the elastic support stand is no more blocked by the anti-return protrusion but sprung up to the motorcycle body. The present invention can avoid the traffic accident caused by that the rider forgets to kick up the motorcycle stand.

10 Claims, 6 Drawing Sheets

SAFETY MOTORCYCLE STAND

This application claims priority for Taiwan patent application no. 104205213 filed on Apr. 8, 2015, the content of which is incorporated by reference in its entirely.

BACKGROUND OF THE INVENTION

1. Field of the Invention

The present invention relates to a support stand for standing a motorcycle up, particularly to a safety motorcycle stand that will be lifted up elastically while the motorcycle is started.

2. Description of the Related Art

Motorcycles or motorbikes feature dexterity, high mobility, easiness to park, and lower price than automobiles. Therefore, motorcycles are extensively used as common vehicles. The quantity of motorcycles is very great, and the proportion of the motorcycle owners in population is very high. In Taiwan a densely-populated island, motorcycles make up a very large proportion of the total vehicles.

The main stand of a motorcycle is an H-shaped frame having a force application rod whereby the rider applies force to stand the motorcycle up and having a spring whose two ends are respectively hooked to the motorcycle frame and one side of the motorcycle main stand for providing a resilience force to restore the main stand to the original position. While a motorcycle is to be parked, an additional space is needed to allow the rider to stand beside the motorcycle for parking operation in addition to the space for the motorcycle itself. While the parking lot has other motorcycles parked at two sides thereof, the rider has to move the other motorcycles laboriously to make a space for parking operation, or press down the side stand of his motorcycle and then push his motorcycle into the parking lot.

A commonly-seen motorcycle side stand has an elastic element whose two ends are respectively hooked to the side stand and an external side of the main stand. However, the elastic element will be damaged and loosened by weathering and finally drop off. It would make the rider inconvenient to run his motorcycle. A side stand is merely a rod-like structure having a given length and installed on the bottom of the motorcycle. A side stand is only suitable to park a motorcycle obliquely on a plane, wherein the gravity center of the motorcycle falls on the plane formed by the tiptoe of the side stand and two wheels of the motorcycle. In most cases, while a motorcycle is going to run, the rider kicks up the side stand to favor the running of the motorcycle; while the motorcycle is to be parked, the rider presses down the side stand to park the motorcycle. However, a rider may forget to kick up the side stand sometime. In such a case, if the rider runs his motorcycle faster and the side stand collides with the ground, the motorcycle may overturn, which may harm the rider or even endanger his life. Besides, a side stand may malfunction after long time usage. In such a case, if the side stand happens to descend by vibration during motorcycle running, the rider may have a safety risk.

In order to solve the abovementioned problems, the present invention proposes a safety motorcycle stand to avoid the safety risk caused by that the rider forgets to kick up the side stand or that the side stand descends by vibration during motorcycle running.

SUMMARY OF THE INVENTION

The primary objective of the present invention is to provide a safety motorcycle stand, wherein the safety motorcycle stand is electrically connected with the start switch, and wherein the safety motorcycle stand supporting the motorcycle on the ground will be automatically sprung up, whereby to avoid the danger that the rider forgets to kick up the motorcycle stand and the motorcycle stand collides with the ground, wherefore the driving safety is increased.

Another objective of the present invention is to provide a safety motorcycle stand, wherein the motorcycle stand supporting the motorcycle on the ground would not be sprung up unless the motorcycle is started, whereby another person cannot push up the motorcycle stand to take away the motorcycle, and whereby the motorcycle stand is locked tightly and the parked motorcycle are less likely to slip or fall down on an uphill street.

A further objective of the present invention is to provide a safety motorcycle stand whose anti-return protrusion will block the weathered and loosened motorcycle stand, whereby to prevent the motorcycle stand from dropping to the ground less the rider's safety be endangered.

Below, embodiments are described in detail in cooperation with the attached drawings to make easily understood the objectives, technical contents, characteristics and accomplishments of the present invention.

DETAILED DESCRIPTION OF THE INVENTION

Normally, a motorcycle is parked using an H-shaped stand (or called the main stand) or a stand installed at one side of the motorcycle (or called the side stand). The safety motorcycle stand disclosed by the present invention is primarily related to a motorcycle side stand.

Figure 1:
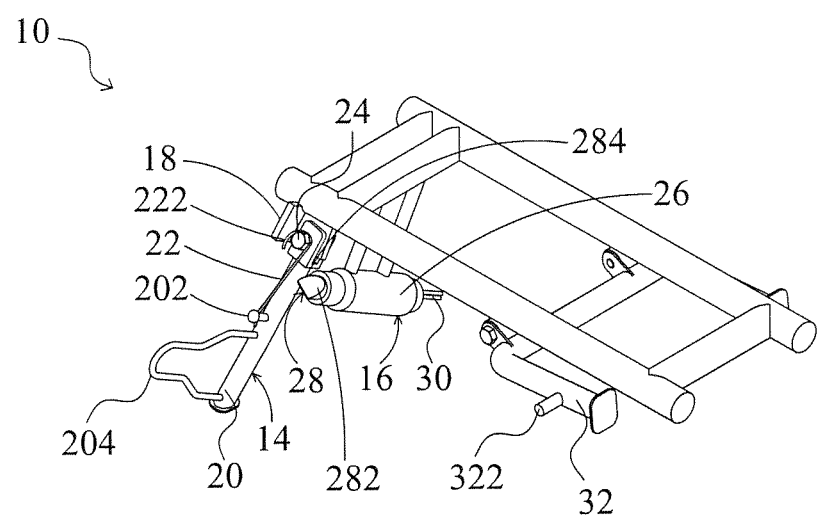
FIG. 1 is a perspective view schematically showing a safety motorcycle stand according to one embodiment of the present invention.
Figure 2:
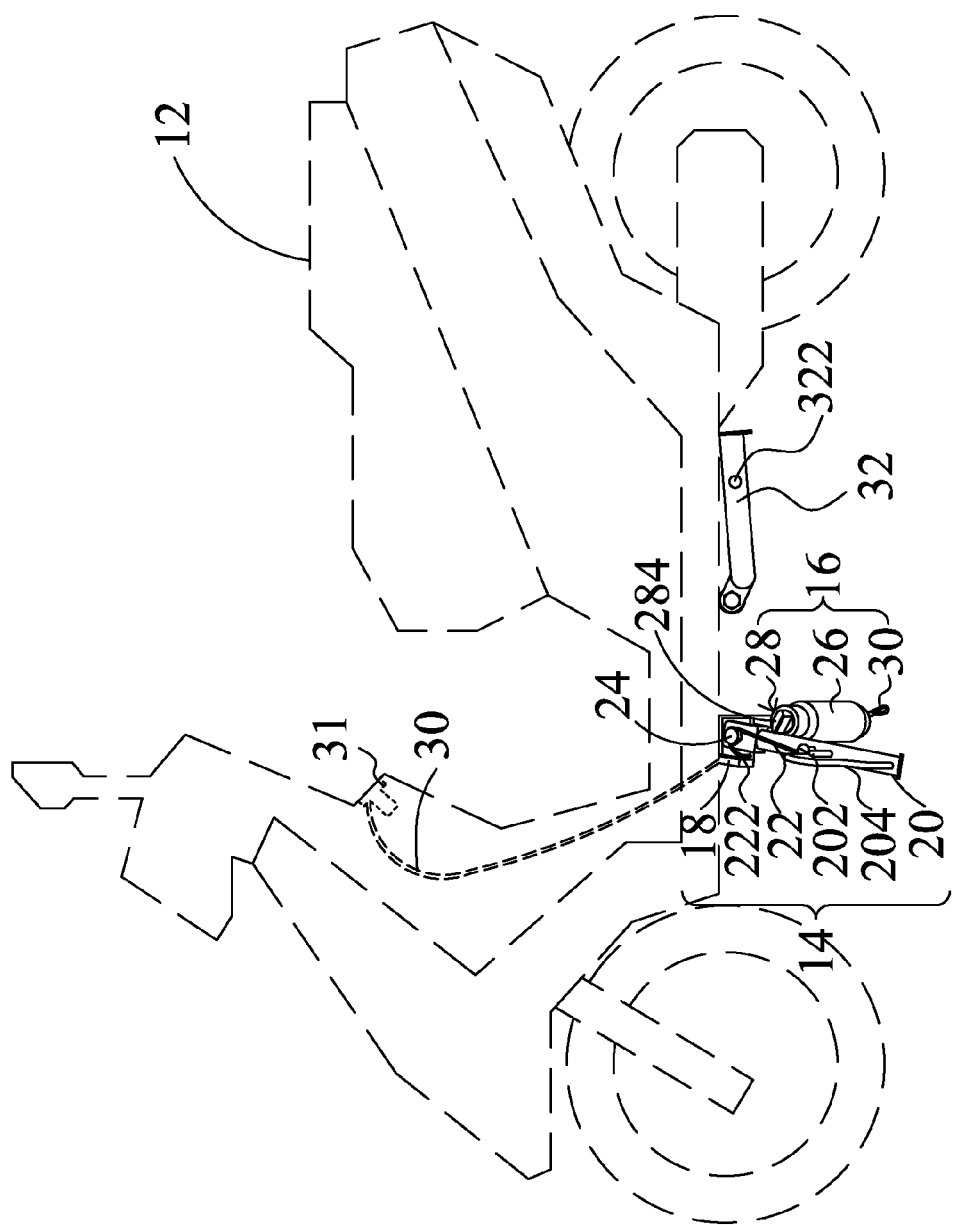
FIG. 2 is a diagram schematically showing that a safety motorcycle stand is installed in a motorcycle body according to one embodiment of the present invention.
Figure 3:
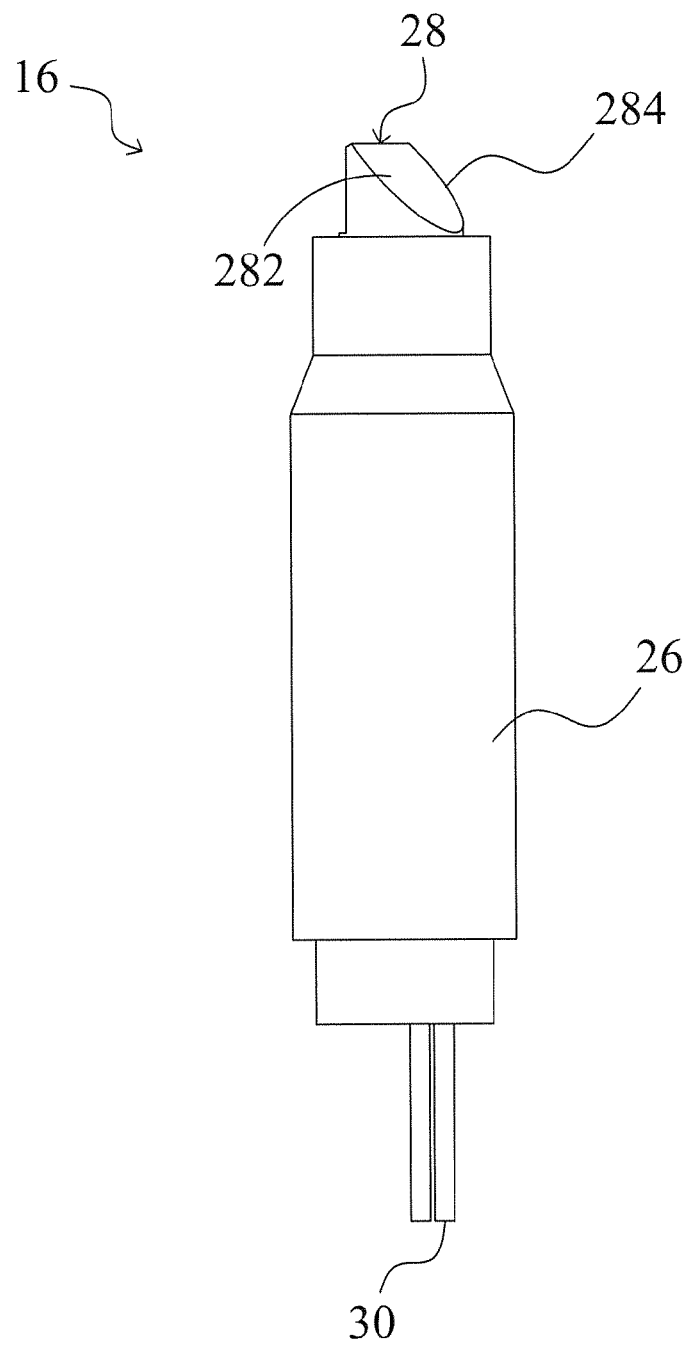
FIG. 3 is a top view schematically showing an electromagnetic switch device according to one embodiment of the present invention.

Refer to FIG. 1 and FIG. 2 for the components of the present invention and the relationship thereof. The safety motorcycle stand 10 of the present invention is installed on the bottom of a motorcycle body 12 and comprises an elastic support stand 14 and an electromagnetic switch device 16, both of which are installed on the bottom of the motorcycle body 12. The elastic support stand 14 can descend to contact the ground and support the motorcycle body 12 to stand on the ground. The elastic support stand 14 includes a blocking plate 18, a stand body 20 pivotally coupled to the bottom of the motorcycle body 12, and an elastic element 22. The stand body 20 has a protruding pillaret 202 and a pedal member 204 on the bottom thereof. A curved end 222 of the elastic element 22 is coupled to the stand body 20 via a fixing element 24. In one embodiment, the fixing element 24 is a screw, and the curved end 222 of the elastic element 22 is coupled to the blocking plate 18. The other end of the elastic element 22 is fastened to the protruding pillaret 202. The blocking plate 18, the stand body 20 and the elastic element 22 are all made of metallic materials. Refer to FIG. 3. The electromagnetic switch device 16 includes a switch body 26, an anti-return protrusion 28 installed inside one side of the switch body 26, and a signal cable 30 disposed at another side of the switch body 26. The anti-return protrusion 28 protrudes from the switch body 26 to block the elastic support stand 14. One side of the anti-return protrusion 28 is a smooth curved surface 282. Another side of the anti-return protrusion 28 is a side blocking surface 284. The signal cable 30 is electrically connected with a start switch 31 of the motorcycle body 12. The safety motorcycle stand 10 of the present invention further comprises a vertical support stand (a main stand) 32 installed on the bottom of the motorcycle body 12 and having a pedal member 322. The vertical support stand 32 is coupled to the elastic support stand 14 and the electromagnetic switch device 16 to form the safety motorcycle stand 10 of the present invention.

Figure 4:
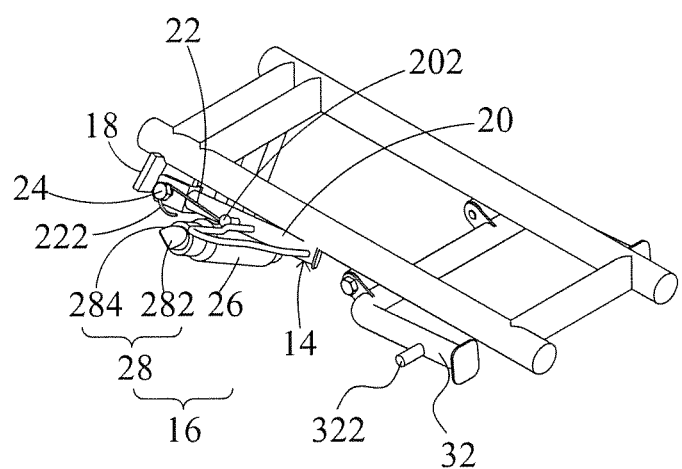
FIG. 4 is a diagram schematically showing a safety motorcycle stand in a folded state according to one embodiment of the present invention.
Figure 5:
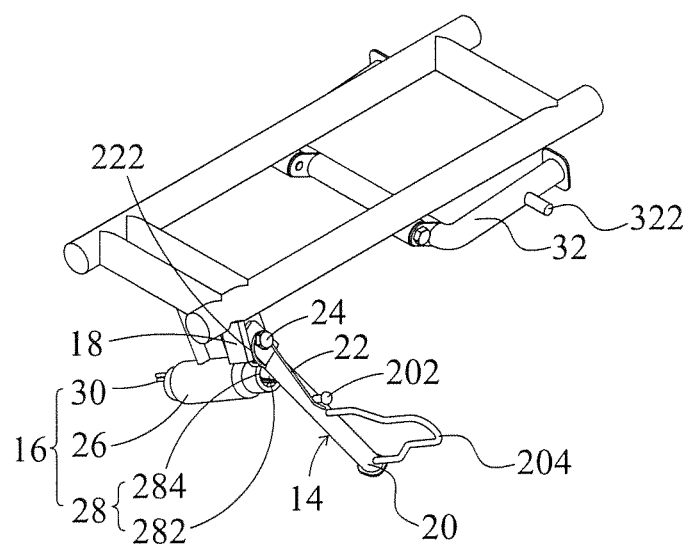
FIG. 5 is a diagram schematically showing that a stand body is pressing an anti-return protrusion into a switch body according to one embodiment of the present invention.
Figure 6:
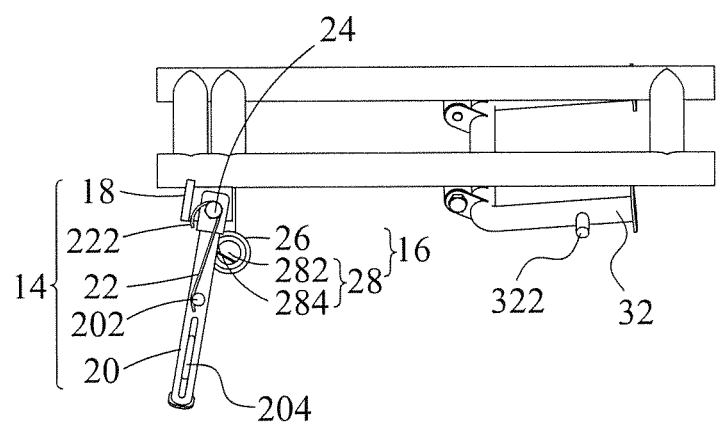
FIG. 6 is a diagram schematically showing a safety motorcycle stand in usage according to one embodiment of the present invention.

After the description of the components of the safety motorcycle stand of the present invention and the relationship thereof, the operation of the safety motorcycle stand will be described below. Refer to FIGS. 4-6. FIG. 4 is a diagram schematically showing a folded state of a safety motorcycle stand according to one embodiment of the present invention. As shown in FIG. 4, the safety motorcycle stand 10 in a folded state does not contact the ground but is folded to parallel the ground. As shown in FIG. 5, the elastic support stand 14 is pressed down by an external force to contact the ground. For example, the rider pedals the pedal member 204 with his foot to press down the elastic support stand 14. Thus, the entire stand body 20 is rotated to slip over the smooth curved surface 282 of the anti-return protrusion 28 with the curved end 222 of the elastic element 22 rotated together. While slipping over the smooth curved surface 282, the stand body 20 presses the entire anti-return protrusion 28 into the switch body 26. As shown in FIG. 6 and FIG. 2, after the stand body 20 has completely slipped over the anti-return protrusion 28 of the switch body 26, the anti-return protrusion 28 will be sprung out of the switch body 26 with the side blocking surface 284 of the anti-return protrusion 28 pressing against the stand body 20 and the stand body 20 also pressing against the side blocking surface 284. Meanwhile, the force pressing the stand body 10 also presses the entire elastic support stand 14 together with the curved end 222 of the elastic element 22 against the blocking plate 18. Thus, the entire elastic support stand 14 stops rotating, and a reactive force applies to the entire elastic support stand 14. Then, the stand body 10 is fixed by side blocking surface 284, and the entire elastic support stand 14 is positioned between the motorcycle body 12 and the ground. While intending to ride the motorcycle, the rider will turn on the start switch 31 on the motorcycle body 12. As soon as the start switch 31 is turned on, an instantaneous starting current is generated and transmitted to the electromagnetic switch device 16 via the signal cable 30. At this time, the anti-return protrusion 28 is withdrawn into the switch body 26 immediately, no more pressing against the stand body 20. Thus, the reactive force generated by the curved end 222 of the elastic element 22 and the blocking plate 18 springs the stand body 20 upward from the ground. After the starting current diminishes, the anti-return protrusion 28, which is withdrawn into the switch body 26 by the starting current, springs out of the switch body 26 and protrudes from the switch body 26. Then, the safety motorcycle stand 10 resumes the folded state shown in FIG. 4, and the stand body 20 is folded up.

Refer to FIG. 1 and FIG. 2 again. The vertical support stand 32 is an ordinary H-shaped stand of a motorcycle. The usage of the vertical support stand 32 of the present invention is the same as in the conventional technology. The rider can pushes down the pedal member 322 of the vertical support stand 32 with his foot to stand the motorcycle up on the ground vertically. No matter whether the elastic support stand 14 and the vertical support stand 32 are assembled together or separately, they will not interfere with each other.

The safety motorcycle stand of the present invention will spring up s soon as the motorcycle is started, avoiding the traffic accident caused by that the rider forgets to kick up the side stand and preventing from slippage or turnover of the motorcycle caused by that the side stand contacts the ground while the motorcycle is running at a high speed. While the motorcycle using the present invention is parked outdoors, another is unlikely to take the motorcycle away because he cannot fold up the motorcycle stand. The locked elastic support stand would effectively hinder a thief from moving the motorcycle because the locked elastic support stand will persistently bump into the foot of the thief and disfavor the advance of the thief carrying the motorcycle. The parked motorcycle using the conventional motorcycle stand is likely to be turned over and damaged because the conventional motorcycle stand is likely to spring up by another's collision. Contrarily, the present invention can completely prevent from the abovementioned event because the elastic support stand of the present invention is locked tightly and unlikely to spring up by collision. While a motorcycle using a conventional motorcycle stand is parked on an uphill street, the conventional motorcycle stand is likely to spring up, which will cause the motorcycle to slip down. Contrarily, the safety motorcycle stand of the present invention would not spring up but can increase the stability of the motorcycle parked on an uphill street. A weathered motorcycle stand is likely to malfunction or loosen. Even though the safety motorcycle stand of the present invention is loosened or detached from the motorcycle body, the loosened or detached safety motorcycle stand would not drop off directly or hang down to contact the ground but is stilled held by the anti-return protrusion, whereby the safety motorcycle stand of the present invention can avoid the like accidents and protect the rider and motorcycle.

The embodiments have been described in detail to demonstrate the technical thought and characteristics of the present invention. However, these embodiments are only to exemplify the present invention but not to limit the scope of the present invention. Any equivalent modification or variation according to the spirit of the present invention is to be also included within the scope of the present invention.

What is claimed is:

1. A safety motorcycle stand installed on a bottom of a motorcycle body and comprising an elastic support stand installed on said bottom of said motorcycle body, pressed down by an external force to contact the ground and stand said motorcycle body up on the ground; and an electromagnetic switch device installed on said bottom of said motorcycle body, and including a switch body, an anti-return protrusion installed inside one side of said switch body and a signal cable disposed at another side of said switch body, wherein said anti-return protrusion is protruded from said switch body to press against said elastic support stand pressed down by said external force to make said elastic support stand fixed to one side of said motorcycle body and the ground, and wherein said signal cable is electrically connected with a start switch of said motorcycle body to enable said electromagnetic switch device to receive a starting current of said start switch, and wherein as soon as said electromagnetic switch device receives said starting current of said start switch, said anti-return protrusion of said electromagnetic switch device is withdrawn into said switch body and will not hindering said external force from pressing down said elastic support stand, and wherein as soon as said starting current diminishes, said anti-return protrusion of said electromagnetic switch device is sprung out of said switch device and protrudes from said switch device.

2. The safety motorcycle stand according to claim 1, wherein said elastic support stand includes
- a blocking plate installed on said bottom of said motorcycle body;
- a stand body pivotally coupled to said bottom of said motorcycle body and having a protruding pillaret; and
- an elastic element with a curved end thereof coupled to said stand body and said blocking plate and another end thereof fixed to said protruding pillaret, rotated together with said stand body to store potential energy, which is to be released as a resilience force to spring up said stand body.

3. The safety motorcycle stand according to claim 2, wherein said blocking plate, said stand body, and said elastic element are made of metallic materials.

4. The safety motorcycle stand according to claim 2, wherein said curved end of said elastic element is fixed to said stand body via a fixing element.

5. The safety motorcycle stand according to claim 4, wherein said fixing element is a screw.

6. The safety motorcycle stand according to claim 1, wherein said anti-return protrusion has a smooth curved surface on one side thereof and a side blocking surface on another side thereof.

7. The safety motorcycle stand according to claim 6, wherein said external force presses down said elastic support stand to said smooth curved surface of said anti-return protrusion, presses said anti-return protrusion to withdraw into said switch body and slips over said smooth curved surface, and wherein after said elastic support stand slips over said smooth curved surface, said anti-return protrusion is sprung out of said switch body, whereafter said external force continues to press down said elastic support stand to contact the ground and stand said motorcycle body up, and said side blocking surface of said anti-return protrusion presses against said elastic support stand.

8. The safety motorcycle stand according to claim 1 further comprising a vertical support stand installed on said bottom of said motorcycle body and pressed down by an external force to contact the ground.

9. The safety motorcycle stand according to claim 8, wherein said vertical support stand is joined with said elastic support stand and said electromagnetic switch device to form an integral body.

10. The safety motorcycle stand according to claim 8, wherein said vertical support stand is made of a metallic material.

* * * * *